US011593222B2

(12) United States Patent
Yadav et al.

(10) Patent No.: US 11,593,222 B2
(45) Date of Patent: Feb. 28, 2023

(54) METHOD AND SYSTEM FOR MULTI-PRONGED BACKUP USING REAL-TIME ATTRIBUTES

(71) Applicant: EMC IP Holding Company LLC, Hopkinton, MA (US)

(72) Inventors: Sunil Yadav, Bangalore (IN); Manish Sharma, Bangalore (IN); Aaditya Rakesh Bansal, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

(21) Appl. No.: 17/020,994

(22) Filed: Sep. 15, 2020

(65) Prior Publication Data

US 2022/0083430 A1 Mar. 17, 2022

(51) Int. Cl.
*G06F 12/00* (2006.01)
*G06F 11/14* (2006.01)
*G06F 9/48* (2006.01)
*G06F 9/50* (2006.01)
*G06F 11/30* (2006.01)

(52) U.S. Cl.
CPC ........ *G06F 11/1461* (2013.01); *G06F 9/4881* (2013.01); *G06F 9/5077* (2013.01); *G06F 11/1451* (2013.01); *G06F 11/3017* (2013.01); *G06F 2209/5018* (2013.01)

(58) Field of Classification Search
CPC ............. G06F 11/1446; G06F 11/1448; G06F 11/1451; G06F 11/1453; G06F 11/1456; G06F 11/1458; G06F 11/1461; G06F 11/1464; G06F 11/1466; G06F 11/1469; G06F 11/1471; G06F 11/2053; G06F 11/2056; G06F 11/2058; G06F 11/2061; G06F 11/2064; G06F 11/2066; G06F 11/2069; G06F 11/2071; G06F 11/2074; G06F 11/2076; G06F 11/2079; G06F 11/2082; G06F 11/2084; G06F 11/2087; G06F 11/2089; G06F 11/2092; G06F 11/2094
See application file for complete search history.

(56) References Cited

U.S. PATENT DOCUMENTS

| | | | |
|---|---|---|---|
| 8,291,170 B1 * | 10/2012 | Zhang ................. | G06F 11/1466 711/135 |
| 9,384,200 B1 * | 7/2016 | Batchu ............... | G06F 11/1435 |
| 10,069,909 B1 * | 9/2018 | Chopra .............. | G06F 11/1464 |
| 2011/0208928 A1 * | 8/2011 | Chandra ............. | G06F 11/1466 711/E12.001 |
| 2014/0282583 A1 * | 9/2014 | Dawson ............... | G06F 9/5016 718/104 |
| 2015/0169341 A1 * | 6/2015 | Gulati ................ | G06F 9/45533 718/1 |

* cited by examiner

*Primary Examiner* — Arvind Talukdar
(74) *Attorney, Agent, or Firm* — Chamberlain, Hrdlicka, White, Williams & Aughtry (57) ABSTRACT

A method and system for backup processes that includes identifying a target volume and identifying a number of available threads to back up the target volume. The elements in the target volume are distributed among the available threads based on a currently pending size of data in the threads. The elements are stored from each thread into a backup container, and merged from each of the backup containers into a backup volume.

18 Claims, 11 Drawing Sheets

METHOD AND SYSTEM FOR MULTI-PRONGED BACKUP USING REAL-TIME ATTRIBUTES

BACKGROUND

Computing devices may include any number of internal components such as processors, memory, and persistent storage. Each of the internal components of a computing device may be used to generate data. The process of generating, storing, and scheduling data may utilize computing resources of the computing devices such as processing and storage. The utilization of the aforementioned computing resources to generate backups may impact the overall performance of the computing resources.

SUMMARY

In general, in one aspect, the invention relates to a method for a backup process that includes identifying the target volume and identifying a number of available threads to back up the target volume. The method includes distributing elements in the target volume among the available threads based on a currently pending size of data in the threads. The elements are stored into backup containers.

In another aspect, the invention relates to a system for performing a backup that includes a backup agent that identifies the target volume and a number of available threads to back up the target volume. The elements are distributed in the target volume among the available threads based on a currently pending size of data in the threads, and transferred using the available threads. The system includes a backup storage device that receives the elements using the available threads and stores the elements from each thread into a backup container of backup containers. The data is merged from each of the backup containers into a backup volume.

In another aspect, the invention relates to a non-transitory computer readable medium that includes computer readable program code, which when executed by a computer processor enables the computer processor to perform a method for a backup process that includes identifying the target volume and identifying a number of available threads to back up the target volume. The method includes distributing elements in the target volume among the available threads based on a currently pending size of data in the threads. The elements are stored from each thread into a backup container of backup containers.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N, A to P, A to M, or A to L. As used herein, the aforementioned labeling means that the element may include any number of items and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to processing jobs associated with backup operations. More specifically, embodiments provide a multi-pronged file level backup approach using real-time level attributes.

In a multi-volume file based backup mechanism, one target volume or target element may be assigned to one thread in an entirely sequential manner. However, a target volume may contain files of different sizes. Sequential backup of the data may result in sub-optimal usage of multiple parallel threads in the backup process. Embodiments disclosed herein provide optimization for parallelization of the backup process using multiple threads. One or more embodiments disclosed herein consider the current pending rollover size for all threads in conjunction with the size of the element to be assigned to a thread. In this manner, embodiments of the invention may improve the utilization of the parallel threads.

Figure 1:
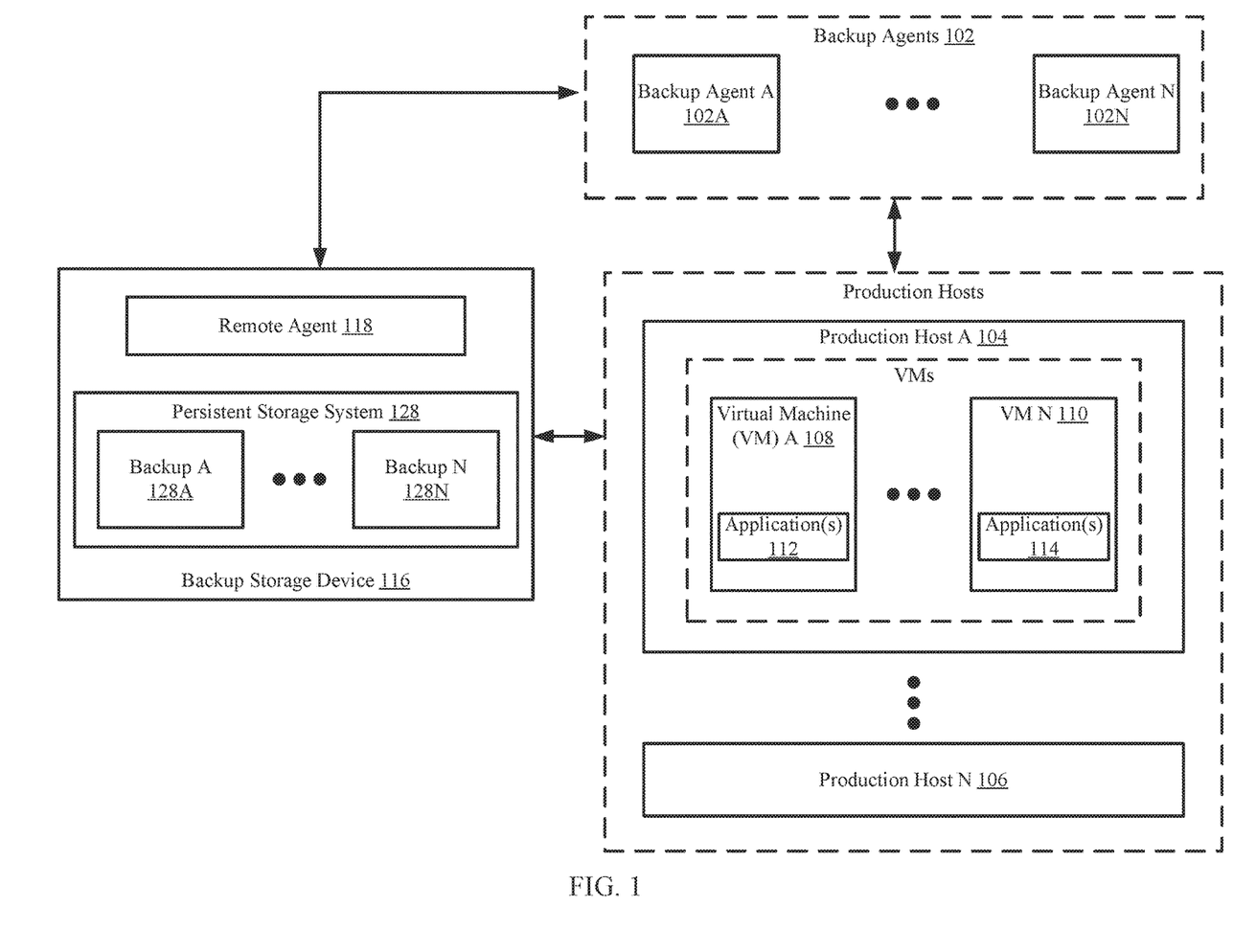
FIG. 1 shows a system in accordance with one or more embodiments of the invention.

FIG. 1 shows an example system in accordance with one or more embodiments of the invention. The system includes backup agents (102A . . . 102N), production hosts (104, 106), and a backup storage device (116). The system may include additional, fewer, and/or different components without departing from the invention. Each component may be operably connected via any combination of wired and/or wireless connections. Each component illustrated in FIG. 1 is discussed below.

In one or more embodiments of the invention, the backup agents (102A . . . 102N) perform backup operations of virtual machines. The backup agents (102A . . . 102N) may each perform a backup operation as assigned by the backup storage device (116). The backup operation may include obtaining data associated with a virtual machine (VM) or application and generating a copy of the data and storing it in a backup format in the backup storage device. The backup agents may perform backup operations in accordance with the jobs described herein. The backup agents may include functionality to obtain the backup properties for the backup jobs associated with a given production host and/or virtual machine. While the backup agents are shown as being external to the production hosts, the backup agents may reside on the production hosts and/or within the virtual machines on the production hosts without departing from the invention.

Figure 4:
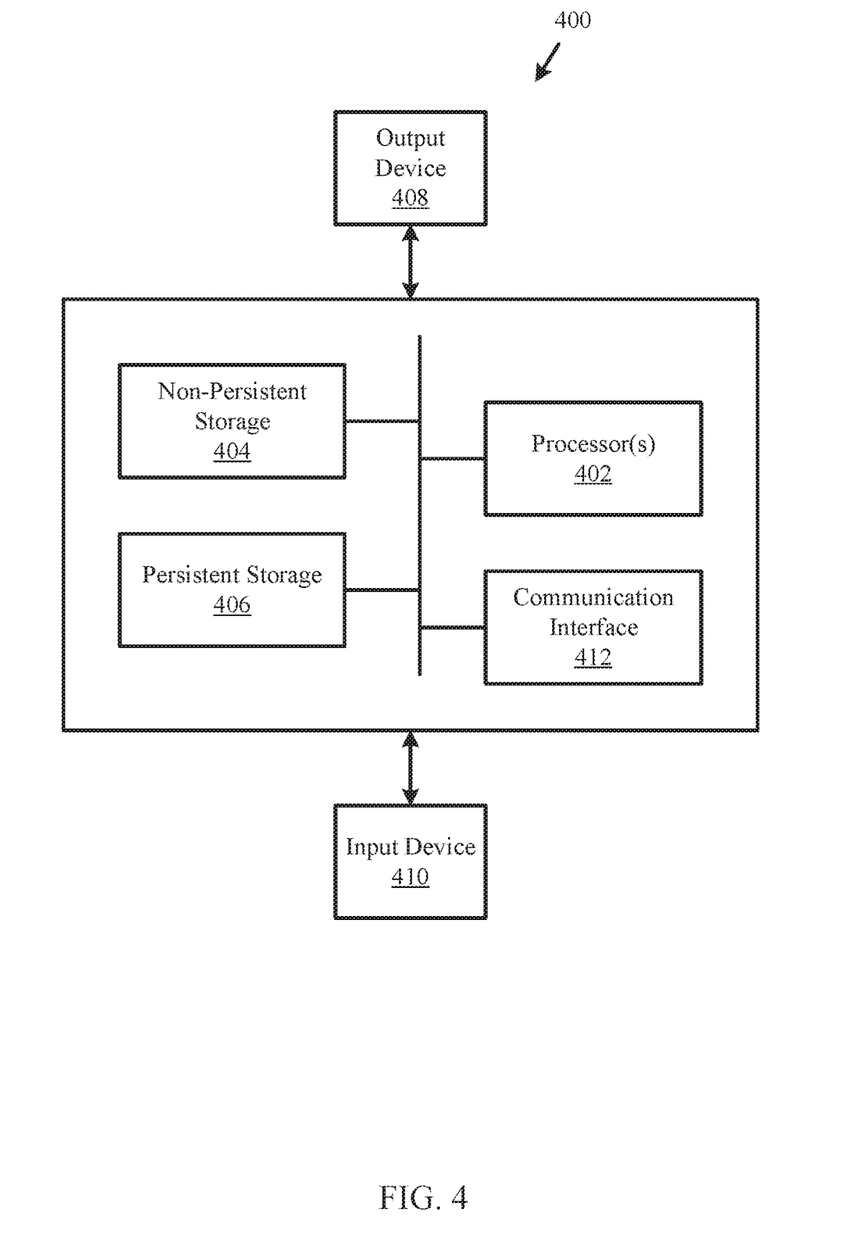
FIG. 4 shows a diagram of a computing device in accordance with one or more embodiments of the invention.

In one or more embodiments of the invention, the backup agents (102A . . . 102N) are implemented as computing devices (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent described throughout this application and/or all, or a portion thereof.

In one or more embodiments of the invention, the backup agents (102A . . . 102N) are implemented as a logical device. The logical device may utilize the computing resources of any number of computing devices and thereby provide the functionality of the backup agents.

In one or more embodiments of the invention, the production hosts (104, 106) may host virtual machines (VMs) (108, 110). The virtual machines (108, 110) may be logical entities executed using computing resources (not shown) of the production hosts. Each of the virtual machines (108, 110) may be performing similar or different processes. In one or more embodiments of the invention, the virtual machines (108, 110) provide services to users, e.g., clients (not shown). For example, the virtual machines (108, 110) may host instances of databases, email servers, and/or other applications (112, 114). The virtual machines may host other types of applications without departing from the invention.

In one or more of embodiments of the invention, the virtual machines (108, 110) are implemented as computer instructions, e.g., computer code, stored on a persistent storage (e.g., on a production host)) that when executed by a processor(s) of the production host cause the production host to provide the functionality of the virtual machines.

In one or more embodiments of the invention, the production host (104, 106) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host described throughout this application.

In one or more embodiments of the invention, the production host (104, 106) is implemented as a logical device. The logical device may utilize the computing resources of any number of computing devices and thereby provide the functionality of the production host described throughout this application.

In one or more embodiments of the invention, the backup storage device (116) may manage the backups of virtual machines (108, 110) hosted by the production hosts (104, 106). The backup storage device (116) may manage the backups by performing jobs in orchestration with the backup agents (102A . . . 102N).

The backup storage device (116) may include additional, fewer, and/or different components without departing from the invention. Each component of the backup storage device (116) is discussed below.

In one or more embodiments of the invention, the backup storage device (116) includes a remote agent (118). The remote agent (118) works in conjunction with the backup agents (102) to process and store the backups in the persistent storage system (128).

In one or more embodiments of the invention, remote agent (118) is a hardware device including circuitry. The remote agent (118) may be, for example, a digital signal processor, a field programmable gate array, or an application specific integrated circuit. The remote agent (118) may be other types of hardware devices without departing from the invention.

In one or more embodiments of the invention, the remote agent (118) is implemented as computing code stored on a persistent storage that when executed by a processor of the backup storage device (116) performs the functionality of remote agent (118). The processor may be a hardware processor including circuitry such as, for example, a central processing unit or a microcontroller. The processor may be other types of hardware devices for processing digital information without departing from the invention.

In one or more embodiments of the invention, the backup storage device (116) may include a persistent storage system (128), which is a system of persistent storage devices that store any number of backups (128A, 128N). In one or more embodiments of the invention, a backup (128A, 128N) is a copy of data associated with a virtual machine. The backup (128A, 128N) may include references to the data that may be used to access the data from the persistent storage system (128). A backup may further include additional data that enables the backup storage device (116) to restore a virtual machine (or a portion of data associated with the virtual machine) associated with the backup from any production host (104, 106). One of ordinary skill in the art will appreciate that the persistent storage system (128) may be a separate entity in a different location than the separately from the backup storage device (116).

In one or more embodiments of the invention, each of the persistent storage system (128) includes magnetic memory devices, optical memory devices, solid state memory devices, phase change memory devices, any other suitable type of persistent memory device, or any combination thereof.

In one or more embodiments, the backup storage device (116) is responsible for the embodiments described in FIG. 3D below. One of ordinary skill in the art will appreciate that the backup storage device (116) may also perform one or more steps of FIGS. 3A-3D without departing from the spirit of embodiments disclosed herein.

Figure 2:
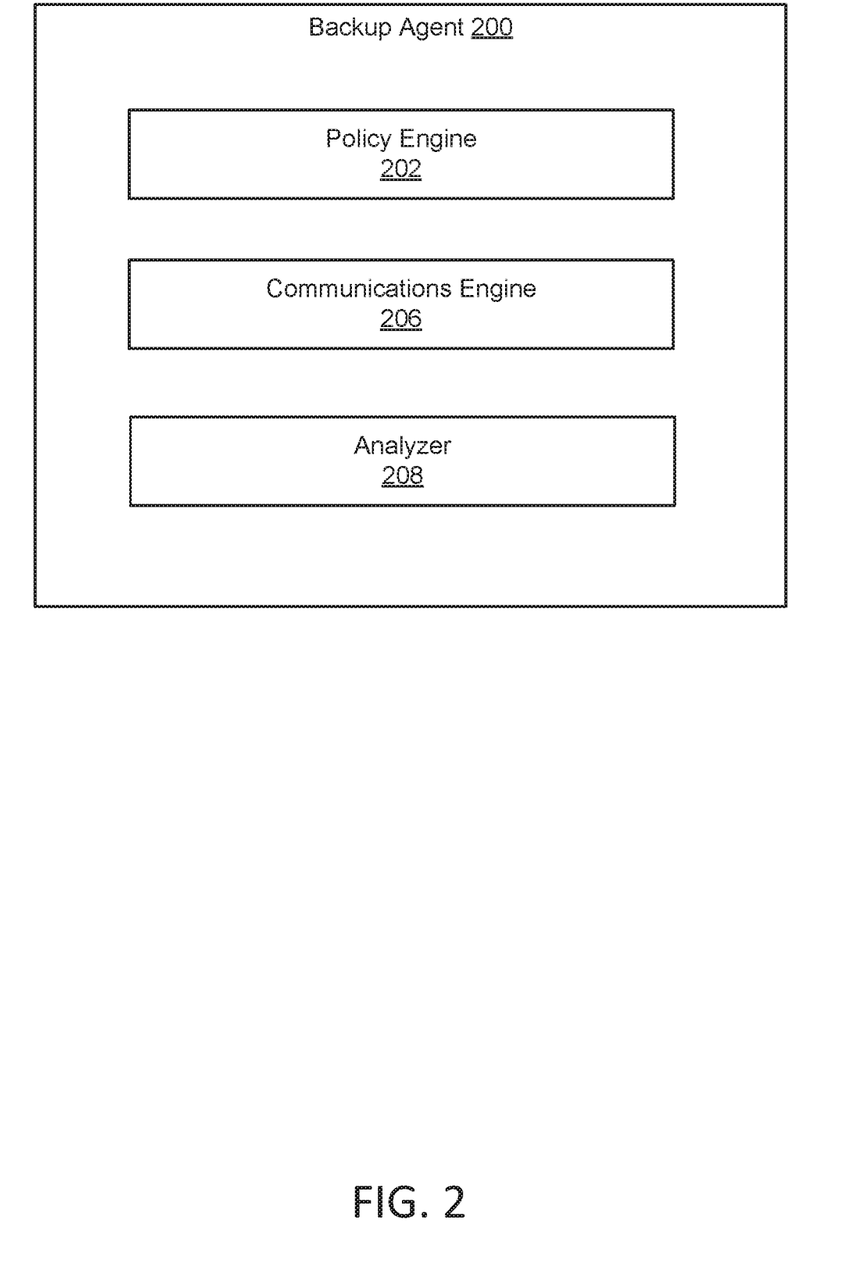
FIG. 2 describes a backup storage device in accordance with one or more embodiments disclosed herein.

FIG. 2 describes the backup agent (202) in accordance with one or more embodiments disclosed herein. The backup storage agent (200) includes a policy engine (202), a communications engine (206), and an analyzer (208). The backup storage agent (200) may include additional, fewer, and/or different components without departing from the invention.

In one or more embodiments, the policy engine (202) stores and maintains the policies to be performed by the backup storage agent (202). The communications engine (206) is responsible for communications to and from the backup storage agent, for example, with the production hosts (104, 106) and backup storage device (116). The communications engine (206) may provide the multiple threads for the multi-pronged backup in accordance with one or more embodiments disclosed herein. In one or more embodiments, the analyzer (208) is responsible for analyzing data and real time attributes to determined compliance of the policies associated with the policy engine (202).

Figure 3A:
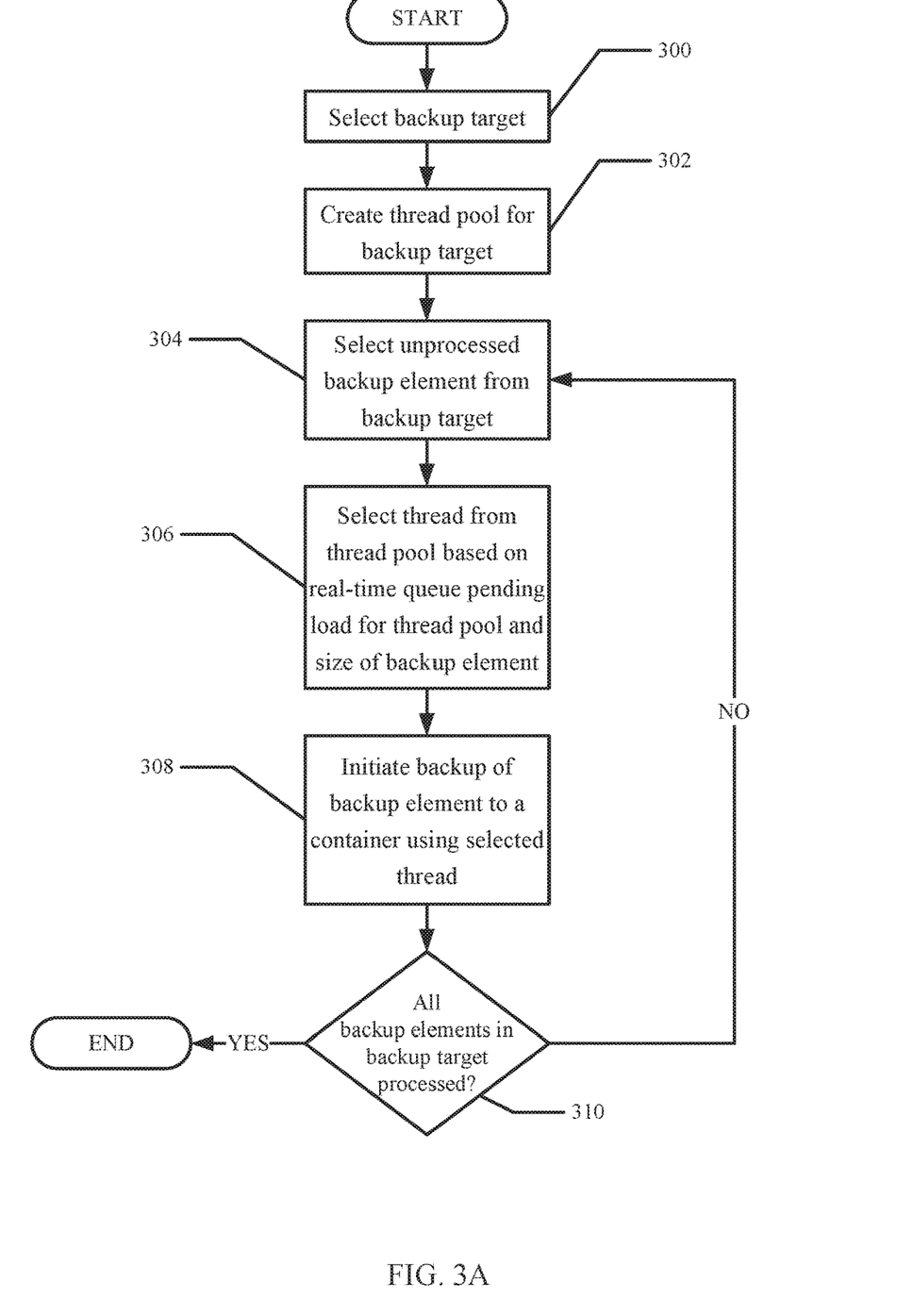
FIGS. 3A, 3B, 3C, and 3D describe methods in accordance with one or more embodiments disclosed herein.
Figure 3B:
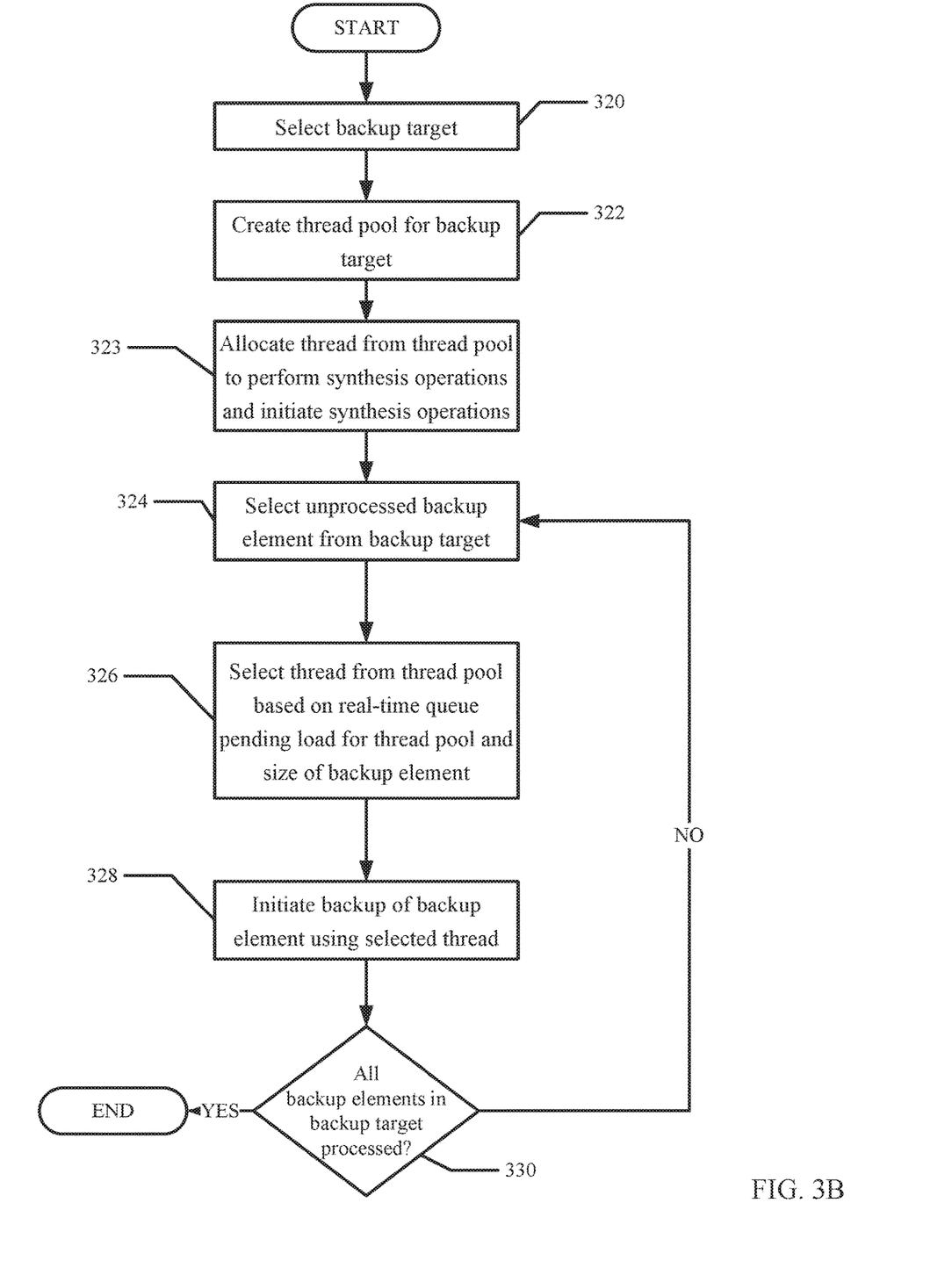
Figure 3C:
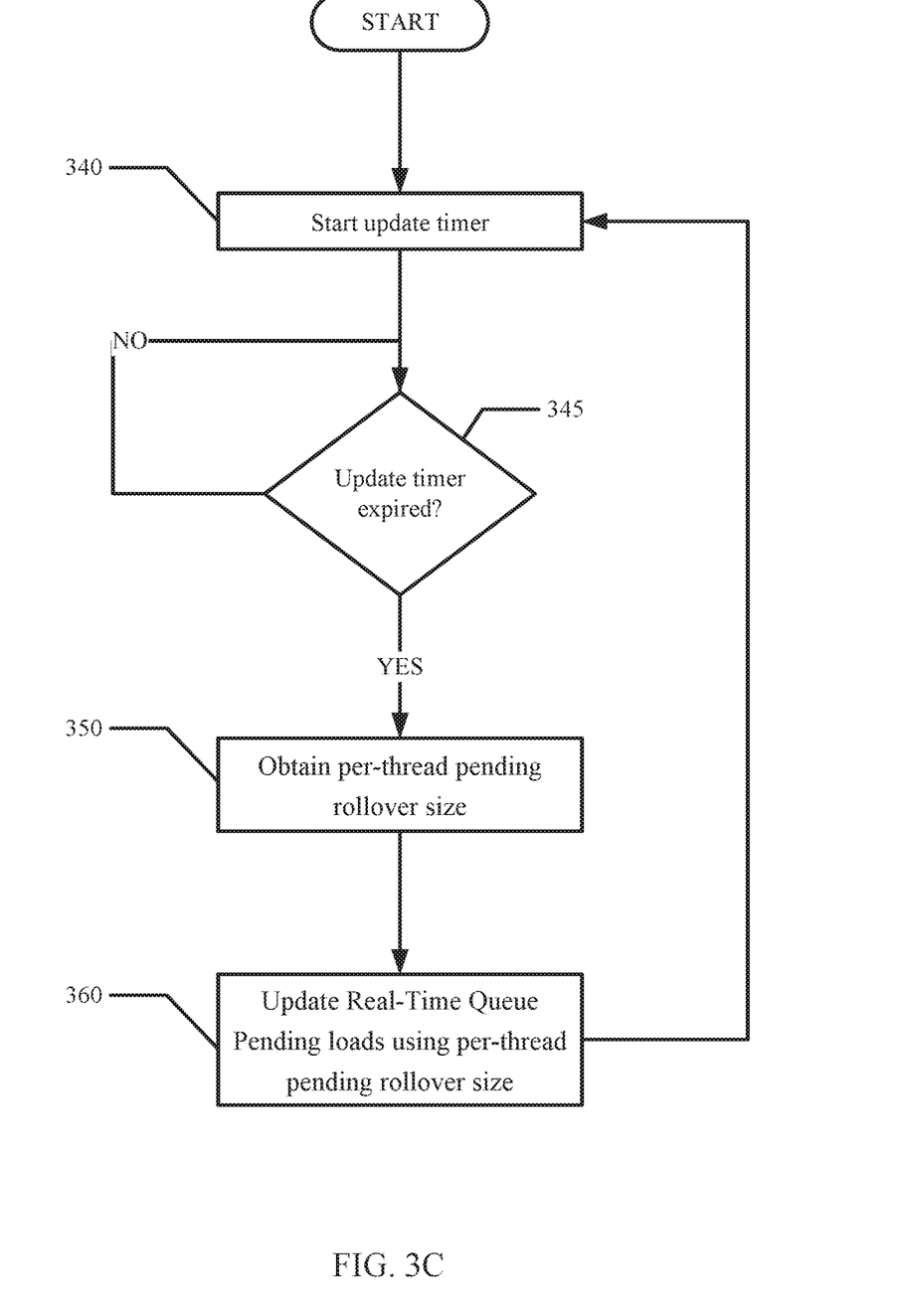

In one or more embodiments, the backup agent (200) is responsible for embodiments of the methods described in FIGS. 3A-3C. One of ordinary skill in the art will appreciate that the backup agent (200) may also perform one or more of the steps of FIG. 3A-3D without departing from the spirit of embodiments disclosed herein.

In one or more embodiments of the invention, the backup agent (200) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device described throughout this application.

FIG. 3A describes a method in accordance with one or more embodiments disclosed herein. The method shown in FIG. 3A may be performed by, for example, a backup agent. Other components of the system in FIG. 1 may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a backup target is selected. The backup target may be a target volume of a production host.

In step 302, a tread pool for the backup target is created. The number of threads created for a backup target may vary depending on the size of the backup target, the type of backup being performed, and the capabilities of the systems in accordance with one or more embodiments disclosed herein.

In step 304, an unprocessed backup element is selected from the backup target. In one embodiment of the invention, the backup target includes a number of elements also referred to as backup elements. Each backup element may correspond to a portion backup target. For example, the backup target may be a volume and a backup element may correspond to a file, a folder, or a directory in the volume.

In step 306, a thread from the thread pool is selected based on real-time queue pending load for the thread pool and the size of the backup element in accordance with embodiments disclosed herein. In one embodiment of the invention, if there is are any currently unallocated or available threads (i.e., threads that have been created but that have not been allocated), the backup element is assigned to one of the available threads (e.g., randomly). However, if there are no free threads, then (i) the thread with the lowest real-time pending queue load is selected or (ii) the thread where the sum of its real-time pending queue load and the backup element size is the lowest relative to all other threads. If under (i) or (ii), there are multiple "lowest" threads, then one of the "lowest" threads is selected randomly (or using any other mechanism). In one embodiment of the invention, the real-time queue pending load for a given thread represent the amount of data that the thread has been allocated to transfer but the transfer of all of this data has been yet been completed. The real-time queue pending load is updated as described in FIG. 3D.

In step 308, the backup of the backup element is initiated to a container using the selected thread. In one or more embodiments, each thread is assigned to a separate receiving container on the backup storage device. In this manner, the threads in the thread poll may be sending data in parallel to their own containers—without any thread blocking any other thread in the thread pool.

In step 310, it is determined if all of the backup elements in the backup target have been processed. If not, the method returns to step 304. If so, the process ends.

FIG. 3B demonstrates another method in accordance with one or more embodiments disclosed herein. The embodiments of FIG. 3B are more applicable to an incremental backup in accordance with one or more embodiments disclosed herein. The method shown in FIG. 3B may be performed by, for example, a backup agent. Other components of the system in FIG. 1 may perform all, or a portion, of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 320, a backup target is selected. The backup target may correspond to a volume of one or more of the production hosts. In step 322, a thread pool is created for the backup target. In accordance with one or more embodiments, the number of threads may be determined based on the capabilities of the system, the size of the backup target, the time allotted for the backup target, etc. In step 324, one thread from the thread pool is allocated to perform synthesis operations for the backup. In one or more embodiments, synthesis operations include informing the system, e.g., the backup storage device, of unchanged elements that do not need to transferred during the backup, as well as file structures/metadata associated with the backup target. Also in step 324, the synthesis operations are initiated on the allocated synthesis thread.

The remaining steps of FIG. 3B proceed in a similar manner to that described in FIG. 3A. Specifically, steps 324-330 correspond to steps 304-310 described above.

FIG. 3C describes monitoring the real-time attributes of the threads in accordance with one or more embodiments disclosed herein. The method shown in FIG. 3C may be performed by, for example, a backup agent. Other components of the system in FIG. 1 may perform all, or a portion, of the method of FIG. 3C without departing from the invention.

While FIG. 3C is illustrated as a series of steps, any of the steps may be omitted, performed in a different order, additional steps may be included, and/or any or all of the steps may be performed in a parallel and/or partially overlapping manner without departing from the invention.

In step 340, an update timer is started. The length of the timer may be set by an administrator. In some embodiments, the length of the timer may be determined by the system based on the number of threads under consideration or the time allotted for the backup process. In step 345, it is determined if the updated timer has expired. In not, the system waits until the timer expires. When the update time has expired, the pending rollover size of each thread is obtained. The pending rollover size corresponds to the amount of data that that has been allocated to the thread but has not yet been processed. In one or more embodiments, the analyzer (208) of the backup agent (200) may be responsible for determining the real-time pending rollover for each of the threads used for the data transfer. In step 360, the real-time queue pending loads are updated using the per-thread pending rollover size. The real-time queue pending loads include the per-thread pending rollover size. After the updating in step 360, the process returns to step 340 and restarts the update timer.

The method in shown in FIG. 3C may be performed continuously thereby providing real-time pending queue loads. In this manner, the backup agent may be able to utilize to most up to date data in order making the thread allocations in FIGS. 3A and 3B.

As noted above, each thread is assigned a separate backup container for receiving the data in the stream. Thus, after data transfer through the threads, the data may be located in different containers and not in any particular order. FIG. 3D describes processing the data in accordance with one or more embodiments disclosed herein. The method shown in FIG. 3D may be performed by, for example, a backup storage device. Other components of the system in FIG. 1 may perform all, or a portion, of the method of FIG. 3D without departing from the invention.

Figure 3D:
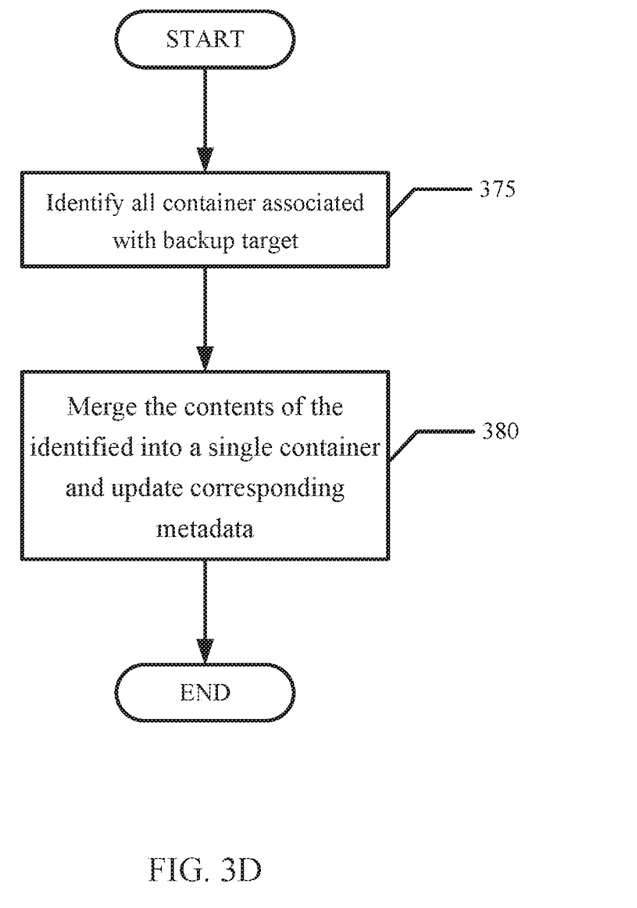

While FIG. 3D is illustrated as a series of steps, any of the steps may be omitted, performed in a different order, additional steps may be included, and/or any or all of the steps may be performed in a parallel and/or partially overlapping manner without departing from the invention.

In step 375, all the containers associated with a backup target are identified. In some embodiments, one such container may contain information on synthesis operations as described in FIG. 3B. In step 380, the contents of the identified containers are merged into a single container and the corresponding metadata is updated. In some embodiments, the merging of the containers may include incorporating, or merging the data, with data from a previously performed backup process as indicated from the synthesis operations performed. In one or more embodiments, the container processing may be performed by the remote agent (118) of the backup storage device (116).

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

FIG. 5 describes one example in accordance with one or more embodiments disclosed herein. The example is not intended to limit the scope of the invention.

Figure 5A:
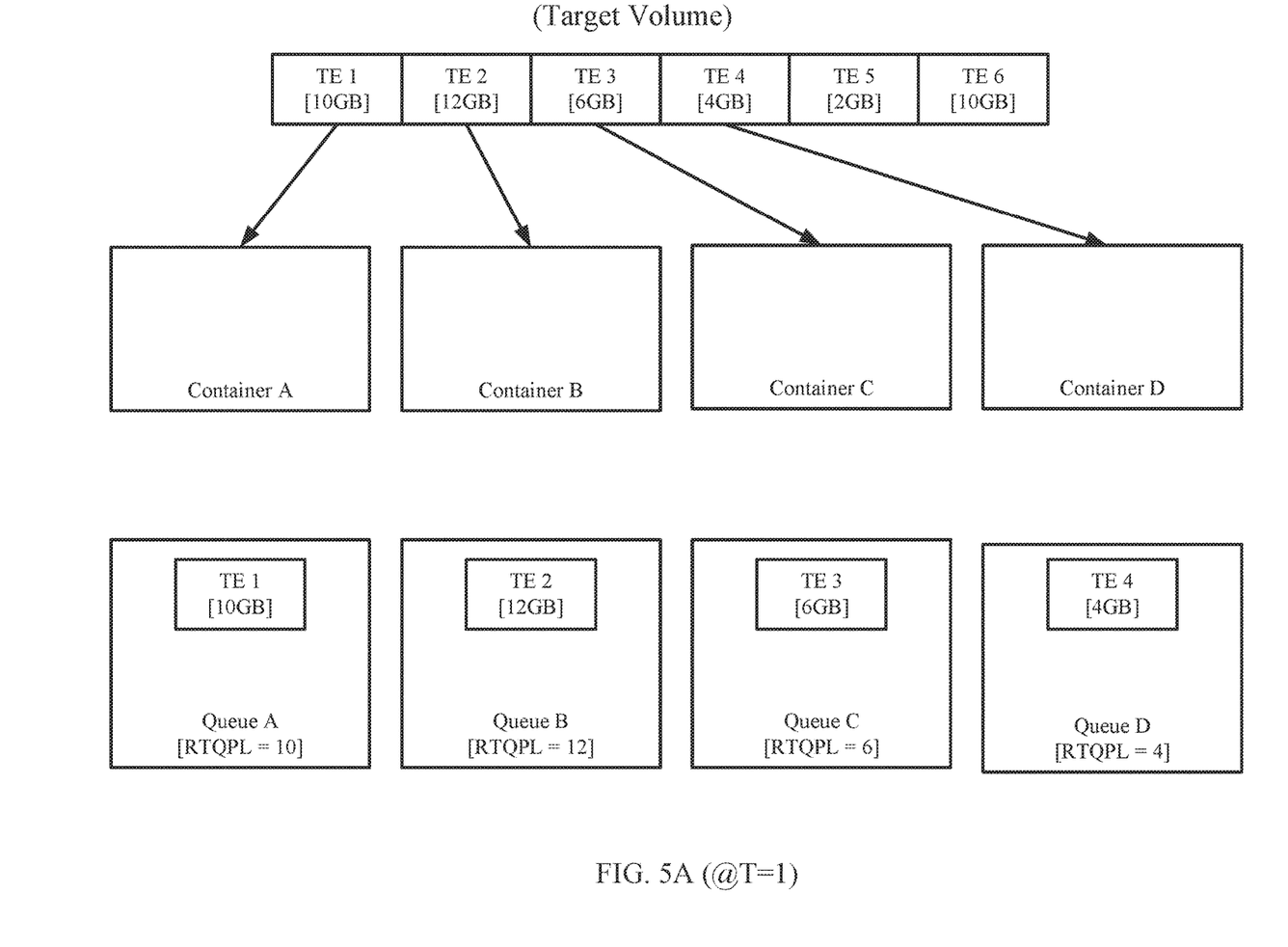
FIGS. 5A, 5B, 5C, and 5D describe an example in accordance with one or more embodiments disclosed herein.

Turning to the example, in FIG. 5A, a backup target with six elements and the corresponding size of each element is shown. In this example, Containers A, B, C, and D each correspond (or are otherwise mapped) to one of the four established threads for the data transfer. Initially, the first four target elements TE 1, TE 2, TE 3, and TE 4 are assigned to the queue for each container A, B, C, and D, respectively. As shown in the bottom of FIG. 5A, at an initial time T=1, Queues A, B, C, and D have a real-time queue pending load (RTQPL) of 10 GB, 12 GB, 6 GB, and 4 GB, respectively.

Figure 5B:
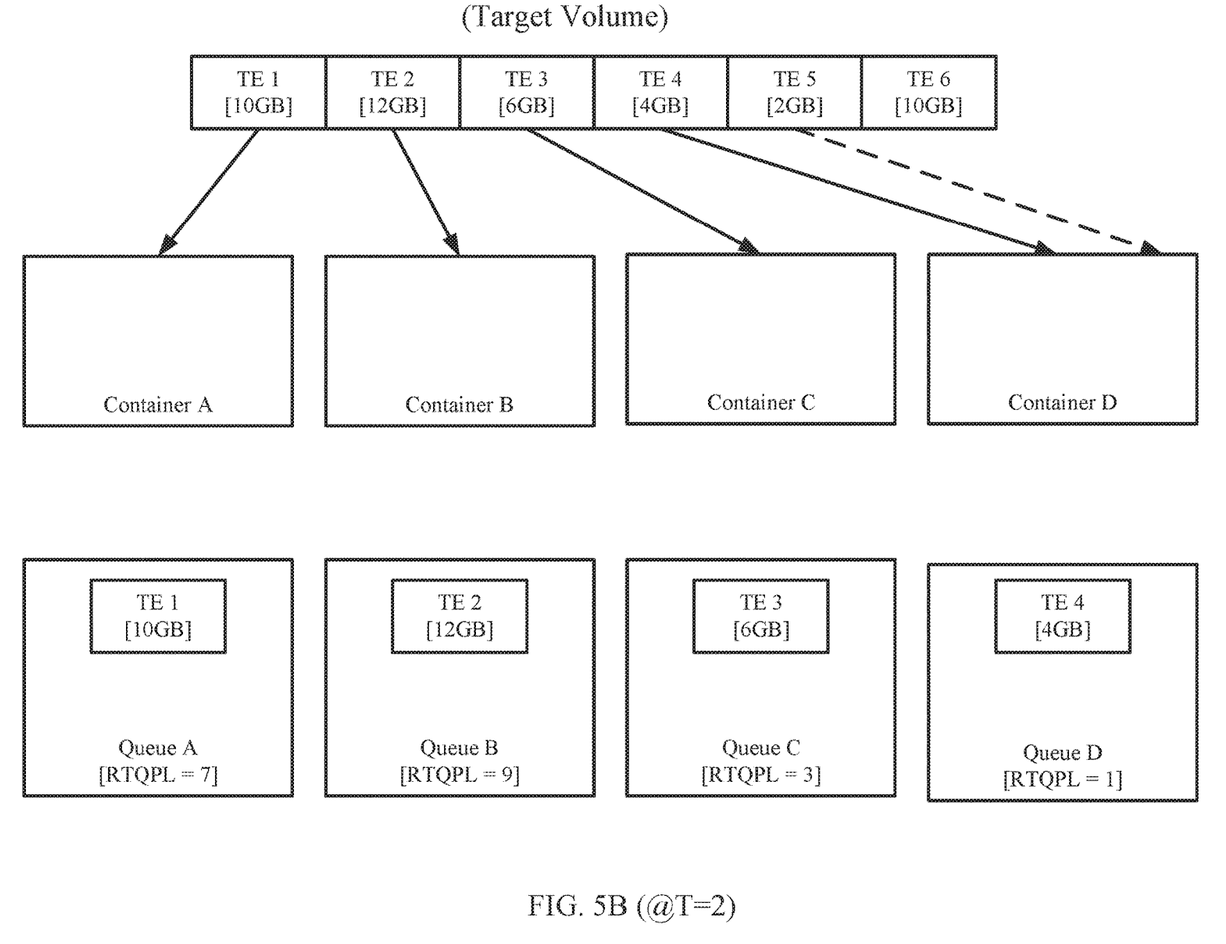

FIG. 5B describes the different queues at a later time T=2. As can be seen in the example of FIG. 5B, the target elements TE 1-4 have transferred approximately 3 GB of data to each of the respective containers A-D. At this time, the backup agent now needs to assign TE 5 to a thread from the thread pool in accordance with FIG. 3A or 3B. In this example, and in accordance with the shown in FIGS. 3A and 3B, the target element TE 5 (of 2 GB size) is assigned to the thread of container D. This is based on the RTQPL of the thread of container D at this time T=2 being less (RTQPL=1) than that of the RTQPL of the other threads.

Figure 5C:
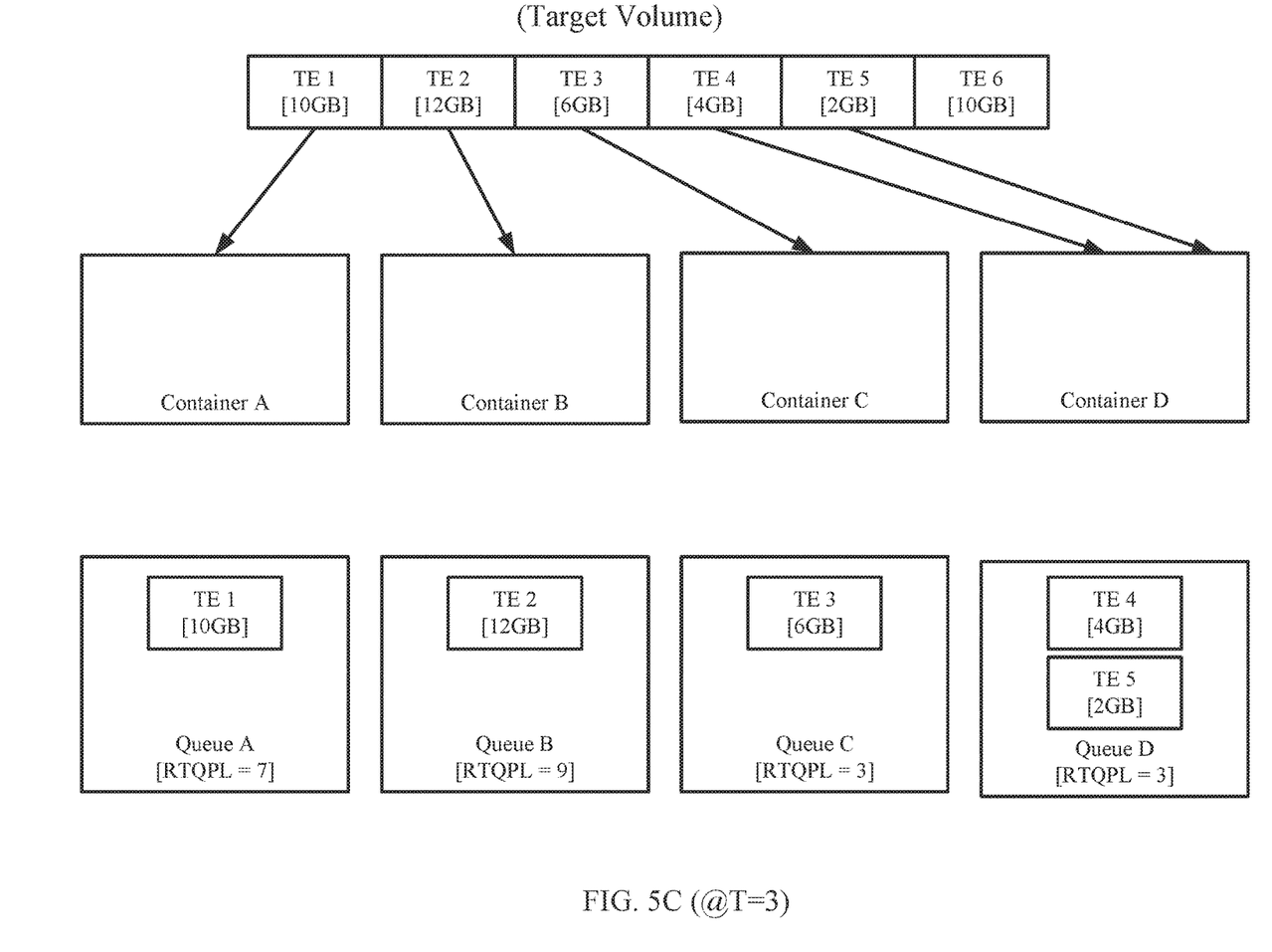

FIG. 5C demonstrates the example immediately after the TE 5 has been assigned to thread associated with the container D. As can be seen in FIG. 5C, the TE 5 has been assigned to the thread associated with container D, resulting in an increased RTQPL of the thread of container D to 3 (i.e., 3 GB).

Figure 5D:
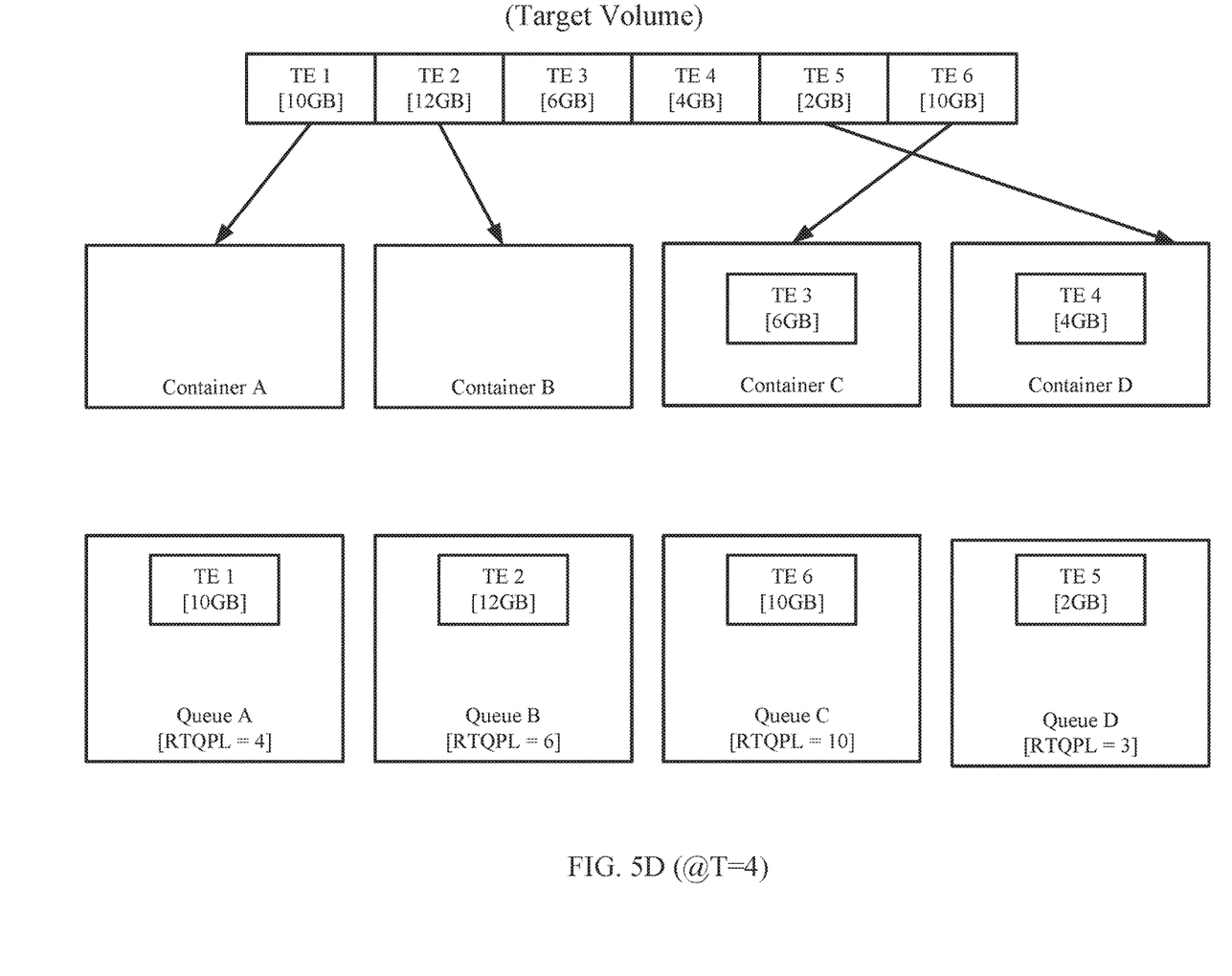

FIG. 5D shows the assignment of target element TE 6 in accordance with one or more embodiments disclosed herein. In FIG. 5D, the backup agent now needs to assign TE 6 to a thread from the thread pool in accordance with FIG. 3A or 3B. In this example, and in accordance with the shown in FIGS. 3A and 3B, the target element TE 6 is assigned to the thread associated with container C, as container C has the lowest RTQPL at the time of assigning TE 6 to a thread. At this time T=4, the target elements TE 3 and TE 4 have completed the transfer to their respective containers C and D. In the example of FIG. 5, the time T illustrated may not necessarily be uniform, for illustrating purposes.

Embodiments disclosed herein provide optimization for parallelization of the backup process using multiple threads, each associated with a stream. Embodiments provide a multi-pronged file level backup approach using real-time level attributes of threads for improved efficiency in backup processes. Embodiments disclosed herein advantageously organize the target elements in the available threads for faster, more efficient backup process using multiple threads.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for a backup process, the method comprising:
identifying a target volume;
identifying a number of available threads to back up the target volume;
distributing elements in the target volume among the available threads based on a currently pending size of data in the threads; and
initiating storage of the elements from each thread into one of a plurality of backup containers,
wherein the backup is an incremental backup and wherein at least one thread of the identified threads is allocated to exclusively perform synthesis operations associated with the backup.

2. The method of claim 1,
wherein the at least one thread exclusively used for synthetic operations transmits information associated with unchanged elements in the target volume.

3. The method of claim 1, wherein distributing elements in the target volume among the available threads based on the currently pending size of data in the threads comprises:
obtaining a currently pending size of data awaiting transfer in each thread; and
distributing an element in the target volume to the thread with lowest currently pending size.

4. The method of claim 1, wherein the currently pending size of data in the threads is obtained periodically by monitoring the threads.

5. The method of claim 1, wherein identifying the number of available threads to back up the target volume comprises:
determining the amount of data to be backed up in the target volume; and
identifying the number of available threads to back up the target volume based on the amount of data.

6. The method of claim 1, wherein each thread is associated with one of the plurality of backup containers and wherein each of the plurality of backup containers is not associated with more than one of the threads.

7. A system for performing a backup, the system comprising:
a backup agent comprising a processor configured to:
identifying a target volume;
identifying a number of available threads to back up the target volume;
distributing elements in the target volume among the available threads based on a currently pending size of data in the threads;
transferring the elements using the available threads;
a backup storage device comprising a processor configured to:
receive the elements using the available threads;
storing the elements from each thread into one of plurality of backup containers; and
merging, after the storing, the data from each of the backup containers into a backup volume,
wherein the backup is an incremental backup and wherein at least one thread of the identified threads is allocated to exclusively perform synthesis operations associated with the backup.

8. The system of claim 7,
wherein the at least one thread exclusively used for synthetic operations transmits information associated with unchanged elements in the target volume.

9. The system of claim 7, wherein distributing elements in the target volume among the available threads based on the currently pending size of data in the threads comprises:
determining a currently pending size of data awaiting transfer in each thread; and
distributing an element in the target volume to the thread with lowest currently pending size.

10. The system of claim 7, wherein merging data from each of the backup containers into a backup volume comprises:
storing the data from each backup container into the backup volume in the same organization as the data in target volume; and
updating metadata information of the data to reflect the storing of the data in the backup volume.

11. The system of claim 7, wherein identifying the number of available threads to back up the target volume comprises:
determining the amount of data to be backed up in the target volume; and
identifying the number of available threads to back up the target volume based on the amount of data.

12. The system of claim 7, wherein the currently pending size of data in the threads is obtained periodically by monitoring the threads.

13. The system of claim 7, wherein each thread is associated with one of the plurality of backup containers and wherein each of the plurality of backup containers is not associated with more than one of the threads.

14. A non-transitory computer readable medium comprising computer readable program code, which when executed by a computer processor enables the computer processor to perform a method, the method comprising:
identifying a target volume;
identifying a number of available threads to back up the target volume;
distributing elements in the target volume among the available threads based on a currently pending size of data in the threads; and
initiating the storage of the elements from each thread into one of a plurality of backup container, wherein the backup is an incremental backup and wherein at least one thread of the identified threads is allocated to exclusively perform synthesis operations associated with the backup.

15. The non-transitory computer readable medium of claim 14, the method further comprising:
wherein the at least one thread exclusively used for synthetic operations transmits information associated with unchanged elements in the target volume.

16. The non-transitory computer readable medium of claim 14, wherein distributing elements in the target volume among the available threads based on the currently pending size of data in the threads comprises:
obtaining a currently pending size of data awaiting transfer in each thread; and
distributing an element in the target volume to the thread with lowest currently pending size.

17. The non-transitory computer readable medium of claim 14, wherein the currently pending size of data in the threads is obtained periodically by monitoring the threads.

18. The non-transitory computer readable medium of claim 14, wherein identifying the number of available threads to back up the target volume comprises:
determining the amount of data to be backed up in the target volume; and
identifying the number of available threads to back up the target volume based on the amount of data.

* * * * *